(12) United States Patent
Hartmann et al.

(10) Patent No.: US 11,163,405 B2
(45) Date of Patent: Nov. 2, 2021

(54) TOUCH- AND/OR PROXIMITY-SENSITIVE INPUT DEVICE, METHOD OF USING THE INPUT DEVICE AND SENSOR FILM

(71) Applicant: DIEHL AKO STIFTUNG & CO. KG, Wangen (DE)

(72) Inventors: Tobias Hartmann, Illertissen-Betlinshausen (DE); Andreas Brauchle, Bad Wurzach-Eintuernenberg (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 0 days.

(21) Appl. No.: 16/778,873

(22) Filed: Jan. 31, 2020

(65) Prior Publication Data

US 2020/0257385 A1    Aug. 13, 2020

(30) Foreign Application Priority Data

Feb. 8, 2019 (DE) .............................. 102019000919

(51) Int. Cl.
| | |
|---|---|
| *G06F 3/044* | (2006.01) |
| *H01Q 1/22* | (2006.01) |
| *D06F 34/30* | (2020.01) |
| *D06F 34/05* | (2020.01) |
| *D06F 101/20* | (2020.01) |

(52) U.S. Cl.
CPC .............. *G06F 3/044* (2013.01); *D06F 34/05* (2020.02); *D06F 34/30* (2020.02); *H01Q 1/2208* (2013.01); *D06F 2101/20* (2020.02); *G06F 2203/04106* (2013.01); *G06F 2203/04108* (2013.01)

(58) Field of Classification Search
CPC ...... D06F 2101/20; D06F 34/05; D06F 34/30; G06F 2203/04103; G06F 2203/04106; G06F 2203/04108; G06F 3/04164; G06F 3/044; G06F 3/0443; H01Q 1/2208; H01Q 7/00

See application file for complete search history.

(56) References Cited

U.S. PATENT DOCUMENTS

| | | | |
|---|---|---|---|
| 9,753,594 B2 | 5/2017 | Yoneji et al. | |
| 2005/0245204 A1* | 11/2005 | Vance | H01Q 9/0421 455/80 |
| 2011/0221509 A1* | 9/2011 | Bergamo | H03K 17/962 327/517 |
| 2012/0314348 A1* | 12/2012 | Moncrieff | H05K 5/0243 361/679.01 |
| 2014/0176819 A1 | 6/2014 | Yilmaz | |

FOREIGN PATENT DOCUMENTS

DE    112013006446 T5    10/2015

* cited by examiner

*Primary Examiner* — Afroza Chowdhury
(74) *Attorney, Agent, or Firm* — Laurence A. Greenberg; Werner H. Stemer; Ralph E. Locher (57) ABSTRACT

A touch-sensitive and/or proximity-sensitive input device has an operator panel, a sensor film and a carrier plate, arranged on a side of the operator panel that is facing away from a user. The sensor film has at least one capacitive sensor area and also at least one antenna element. Provided on the carrier plate are a sensor circuit that is connected to the capacitive sensor areas and an antenna circuit that is connected to the antenna element. Such an input device can be used for example in electronic domestic appliances or commercial laundry treatment appliances.

18 Claims, 5 Drawing Sheets

TOUCH- AND/OR PROXIMITY-SENSITIVE INPUT DEVICE, METHOD OF USING THE INPUT DEVICE AND SENSOR FILM

CROSS-REFERENCE TO RELATED APPLICATION

This application claims the priority, under 35 U.S.C. § 119, of German application DE 10 2019 000 919, filed Feb. 8, 2019; the prior application is herewith incorporated by reference in its entirety.

BACKGROUND OF THE INVENTION

Field of the Invention

The present invention relates to a touch-sensitive and/or proximity-sensitive input device with a capacitive functional principle.

Many electronic appliances, in particular including domestic appliances, use touch-sensitive and/or proximity-sensitive input devices (often also referred to as "touch control"), which initiate a certain switching operation and/or change an appliance setting by simply being touched or approached by a user. In the case of modern appliances, there is increasingly also a requirement for the possibility of data exchange with mobile terminals. Thus, a user may for example receive information from a domestic appliance on his mobile phone or use his mobile phone to activate a domestic appliance. In the case of commercial applications, such as for example laundry treatment appliances, customers may use their mobile phone to pay without cash. For this purpose, the appliances require not only the input device, for example in the manner of touch control, but also means for wireless communication.

SUMMARY OF THE INVENTION

The object of the invention is to provide a concept for combining a touch-sensitive and/or proximity-sensitive input possibility with a possibility for wireless data exchange that can be realized with a simple and compact structure.

This object is achieved by a touch-sensitive and/or proximity-sensitive input device with the features of the independent claim. Particularly advantageous configurations and developments of the invention are the subject of the dependent claims.

The touch-sensitive and/or proximity-sensitive input device of the invention includes an operator panel with a functional portion, a sensor film with at least one capacitive sensor area and a carrier plate with a sensor circuit, which is arranged on a side of the operator panel that is facing away from a user. The at least one capacitive sensor area is connected to the sensor circuit by way of at least one electrical line, and is characterized in that the sensor film also has at least one antenna element, and furthermore an antenna circuit is provided on the carrier plate. The at least one antenna element is connected to the antenna circuit by way of at least one further electrical line.

According to the invention, it is proposed to use for a touch-sensitive and/or proximity-sensitive input device a sensor film with at least one capacitive sensor area in which an antenna element is also integrated. The integration of the antenna element in the sensor film makes it possible to dispense with separate carriers or a larger carrier plate for mounting the antenna element. In this way, a compact structure of the input device, a reduced number of components and/or simplified assembly/mounting of the input device can be achieved. Furthermore, by being integrated in the sensor film, the antenna is flexible and thus, by analogy with the capacitive sensor areas, can be adapted more easily and better to the geometry of the operator panel. Thus, the measuring accuracy of the sensors and the data exchange via the antenna can be improved.

Together with the antenna circuit, the antenna element is for example a near field communication (NFC) antenna or a radio-frequency identification (RFID) antenna. The antenna element is preferably a structure of an electrically conductive material, which is for example formed by printing or coating a carrier film.

The sensor film has at least one capacitive sensor area, preferably an arrangement of multiple capacitive sensor areas. The sensor areas take the form in each case of an electrode, which is for example formed by printing or coating a carrier film with electrically conductive material. The carrier film is preferably light-transmissive. Together with for example a finger of a user, the sensor area forms via a dielectric (depending on the embodiment, for example the operator panel or a covering on the operator panel) a capacitor of a variable capacitance corresponding to it being touched or not being touched or it being approached or not being approached. The changing of the capacitance value correspondingly has an effect on an output signal of the sensor circuit, which can be processed and evaluated by evaluation electronics.

The at least one sensor area and the at least one antenna element may be provided on the same side or on different sides of the sensor film.

The antenna element is arranged on the sensor film alongside the at least one sensor area or the arrangement of sensor areas or around the at least one sensor area or the arrangement or part of the arrangement of sensor areas. In any event, the antenna element and the sensor areas are electrically separated or isolated from one another.

The operator panel is preferably produced from a plastics material (for example PC, PMMA). The operator panel is preferably a dimensionally stable component and produced for example as an injection moulding. The sensor film is preferably fastened on the operator panel by adhesive bonding.

In a variant of the embodiment of the invention, the sensor film is arranged on a side of the operator panel that is facing away from a user. In this case, the operator panel is preferably configured as electrically non-conducting, at least in the region of the functional portion, in order to form the dielectric of the capacitor. Alternatively or in addition, an electrically non-conducting covering may also be applied on the user side of the operator panel.

In the case of this embodiment, a flexible pressure element is arranged on the side of the operator panel that is facing away from a user, in order to press the sensor film against the operator panel. In this way, the position of the sensor areas relative to the operator panel is defined, whereby the measuring accuracy and reliability of the capacitive sensors are improved. The pressure element may be for example a sheet of foam (for example EPDM), which is supported against the carrier plate or a housing thereof.

In another variant of the embodiment of the invention, the sensor film is arranged on a side of the operator panel that is facing a user. In this case, the sensor film is preferably covered by an electrically non-conducting covering, which then forms the dielectric of the capacitor.

In one configuration of the invention, the sensor circuit and the antenna circuit are connected to one another and configured in such a way that the at least one capacitive sensor area is deactivated while the antenna element is active. In this way, a disturbance of the data exchange via the antenna by the sensors can be prevented.

Alternatively or in addition, the frequencies, arrangements, dimensionings and/or spacings of the sensor areas and the antenna elements may also be adapted such that a mutual disturbance is prevented, or at least minimized.

In one configuration of the invention, the sensor film has at least one clearance in the region outside the at least one sensor area and preferably also outside the antenna element. Through these clearances, air can escape—in particular during the assembly of the input device but also in the mounted state—from the interspaces between the sensor film and the operator panel and/or the covering, whereby air inclusions (for example air pockets, air bubbles) in the capacitors of the sensors can be avoided. Preferably, in the case of this configuration, the operator panel additionally has at least one venting channel, which is connected to the at least one clearance in the sensor film. The sensor areas and the antenna element are thus closer to the user interface of the input device and their operations are not disturbed by air inclusions.

In a further configuration of the invention, the operator panel has in its functional portion, on its side facing the sensor film, in the region outside the at least one sensor area and preferably also outside the antenna element, at least one depression for forming a free space between the sensor film and the operator panel. Air can likewise escape through these depressions—in particular during the assembly of the input device but also in the mounted state—from the interspaces between the sensor film and the operator panel, whereby air inclusions in the capacitors of the sensors can be avoided.

In a further configuration of the invention, the operator panel is configured as raised on its side facing the sensor film, in the region of the at least one sensor area and preferably also in the region of the antenna element. This measure allows close contact between the operator panel and the sensor areas or the antenna element to be ensured, whereby the measuring accuracy and reliability of the capacitive sensors or the antenna can be improved.

The carrier plate, which is preferably configured as a printed circuit board, may, depending on the embodiment, either be directly in engagement with the operator panel or be arranged in a housing that is in engagement with the operator panel.

In a further configuration of the invention, at least one lighting device, preferably in the form of an LED, and/or at least one indicating device (e.g. display, etc.) are arranged on the carrier plate, and the sensor film and the functional portion of the operator panel are configured as at least partially light-transmissive. The light transmittance of the sensor film or the operator panel may preferably be achieved by an appropriate choice of material or by means of apertures.

In a further configuration of the invention, the input device may additionally be configured with a decorative film. This decorative film is for example arranged on the side of the sensor film that is facing a user. With this decorative film, for example, the operating buttons defined by the sensor areas can be identified by symbols. Alternatively, the sensor film itself may also be printed or coated with symbols etc., i.e. the decorative film may be combined with the sensor film to form a component.

In a further configuration of the invention, the input device may additionally be configured with a top layer or top plate. This top layer is preferably arranged on the side of the operator film that is facing a user and may for example be provided with a desired design (company logo, etc.) by the final manufacturer of the appliance in which the input device is installed.

The input device of the invention that is described above can be advantageously used in electronic domestic appliances (hobs, ovens, dishwashers, washing machines, tumble dryers, refrigerators and freezers, etc.) or commercial laundry treatment appliances (for example washing machines, tumble dryers, etc.).

The subject matter of the invention is also a sensor film with at least one capacitive sensor area and at least one antenna element for the touch-sensitive and/or proximity-sensitive input device of the invention that is described above.

The above features and advantages of the invention, as well as others, will be understandable more clearly from the following description of preferred nonrestrictive exemplary embodiments with the aid of the appended drawing in which, sometimes schematically:

Other features which are considered as characteristic for the invention are set forth in the appended claims.

Although the invention is illustrated and described herein as embodied in a touch-sensitive and/or proximity-sensitive input device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
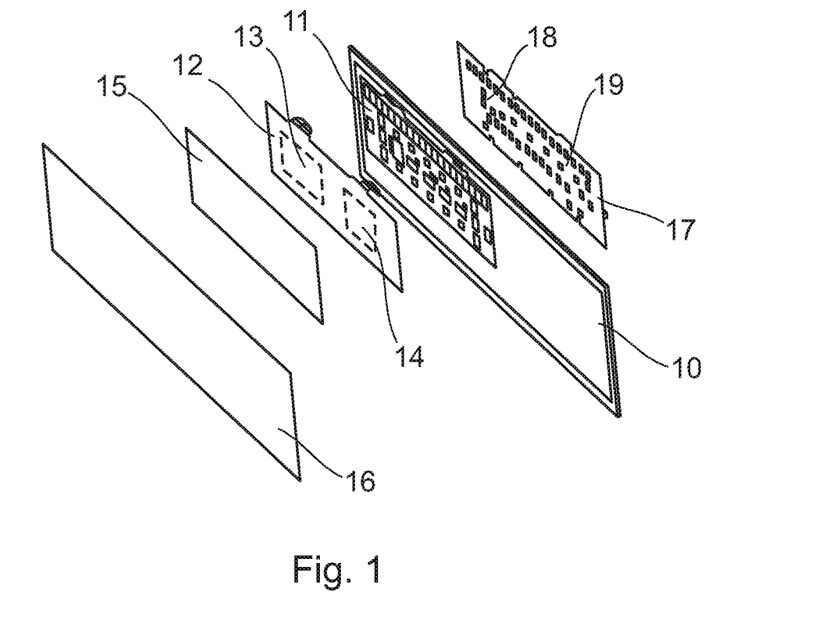
FIG. 1 is a diagrammatic, exploded, perspective view of an input device according to a first exemplary embodiment of the invention.
Figure 2A:
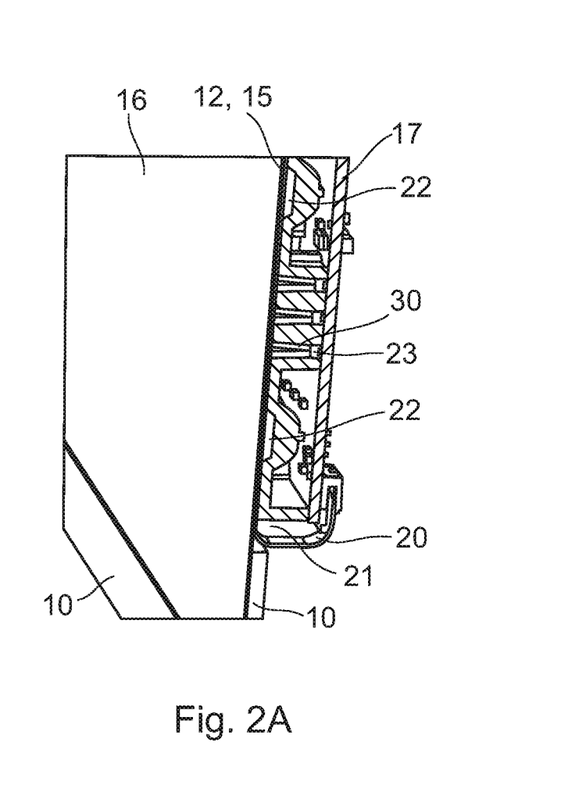
FIGS. 2A and 2B are partial sectional views of the input device from FIG. 1.
Figure 2B:
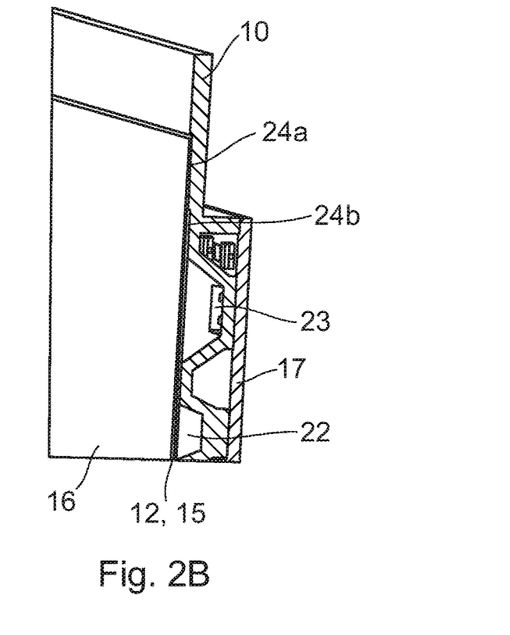

Referring now to the figures of the drawings in detail and first, particularly to FIGS. 1 and 2 thereof, there is shown a structure of an input device according to a first exemplary embodiment of the invention.

The input device has an operator panel 10 formed from a plastics material (e.g. PC or PMMA), which is provided with a functional portion 11. On the side of the operator panel 10 that is facing a user (on the left in FIGS. 1 and 2), a sensor film 12 is arranged. As shown in FIG. 2B, the operator panel 10 is provided in the functional portion 11 with a depression 24b for receiving the sensor film 12. The sensor film 12 may be adhesively bonded to the operator panel 10 in the depression 24b.

As explained later, the sensor film 12 is provided with an arrangement of multiple capacitive sensor areas 13, in order to form a touch-sensitive and/or proximity-sensitive input device with a capacitive functional principle. Furthermore, the sensor film 12 is provided with an antenna element 14, in order to make wireless data exchange possible, for example with a user's mobile phone.

As shown in FIG. 1, a decorative film 15 is also optionally provided on the side of the sensor film 12 that is facing the user. The decorative film 15 is light-transmissive and contains symbols for identifying the operating buttons defined by the sensor areas 13 and back-lit information displays. Alternatively, the symbols may also be printed or coated directly onto the sensor film 12.

Finally, also provided on the side facing a user is a top layer 16, which covers the sensor film 12 and—if present—also the decorative film 15. As shown in FIG. 2B, the operator panel 10 is provided in the functional portion 11 with a depression 24a for receiving the top layer 16. The depression 24b for the sensor film 12 is located within the depression for the top layer 16. The top layer 16 is formed from a plastics material (e.g. PC, PET). It is electrically non-conducting and its layer thickness is at least 2 mm, in order to form a dielectric for the capacitive sensors, and it is configured as at least partially light-transmissive.

On the side of the operator panel 10 that is facing away from a user (on the right in FIGS. 1 and 2) is a carrier plate 17 in the form of a printed circuit board. The carrier plate 17 is fastened on the operator panel 10 for example by screwing or snapping into place. Provided on the carrier plate 17 are a sensor circuit 18 and an antenna circuit 19, which are respectively connected in an electrically conducting manner to the sensor areas 13 and the antenna element 14 on the sensor film 12 by connecting lines, in order to respectively activate the sensor areas 13 and the antenna element 14 and evaluate their measuring signals. The connecting lines 20 are led through an aperture 21 in the operator panel 10. The sensor circuit 18 and the antenna circuit 19 are connected to an appliance controller of the respective appliance in which the input device is installed, which may likewise be arranged on the carrier plate 17 or separately from it.

As shown in FIG. 2A, the operator panel 10 has multiple depressions 22 in its functional portion 11 on its side facing a user. The depressions 22 are located outside the sensor areas 13 and the antenna element 14 and make it possible for air between the operator panel 10 and the sensor film 12 to escape while the latter is being mounted, so that air inclusions can be avoided.

As shown in FIGS. 2A and 2B, multiple lighting devices 23 in the form of LEDs are mounted on the carrier plate 17. The functional portion 11 of the operator panel 10 is accordingly provided with multiple apertures/light channels 30, in order to be light-transmissive. FIG. 2A illustrates in this context LEDs 23 for a 7-segment display, while FIG. 2B shows LEDs 23 for identifying the operating buttons defined by the sensor areas 13.

Figure 3:
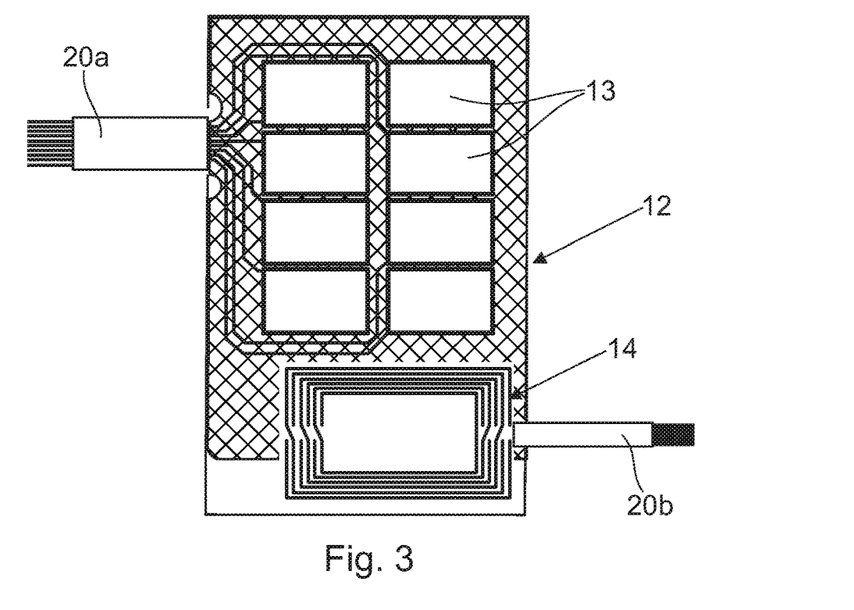
FIG. 3 is a plan view of a sensor film for the input device according to the invention according to a first embodiment.
Figure 4:
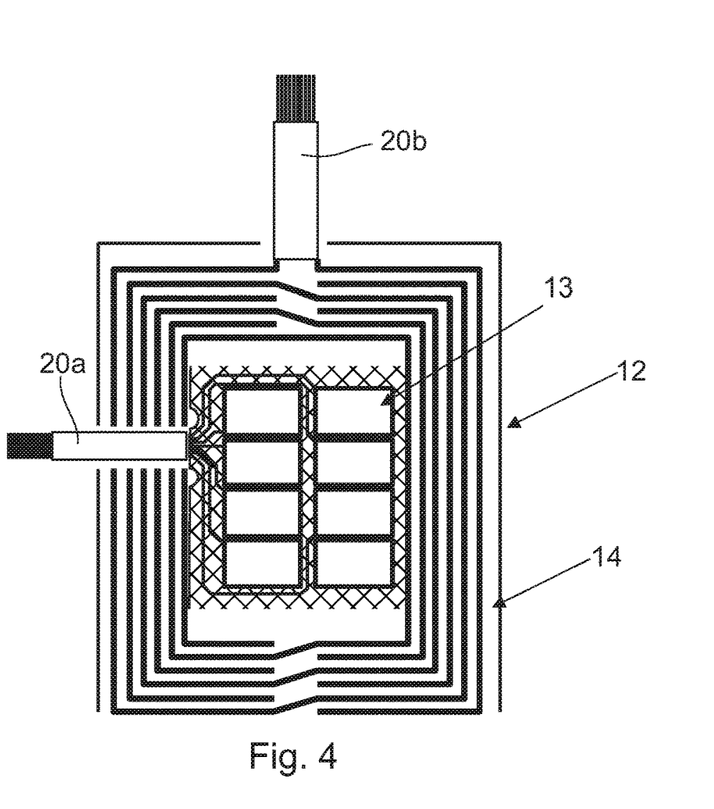
FIG. 4 is a plan view of the sensor film for the input device according to the invention according to a second embodiment.

With reference to FIGS. 3 and 4, two embodiments of the sensor film for an input device of the invention are now described in more detail. The sensor films from FIGS. 3 and 4 may be used for example in the input devices according to FIGS. 1-2, 5, 6 and 7.

FIGS. 3 and 4 show in each case the sensor film 12 with an arrangement of eight capacitive sensor areas 13, the electrode areas of which are connected by way of electrical lines 20a to the sensor circuit 18 on the carrier plate 17, and also an antenna element 14, the line structure of which is connected by way of further electrical lines 20b to the antenna circuit 19 on the carrier plate 17. The electrically conducting elements of the sensor areas 13 and of the antenna element 14 are separated from one another and consequently electrically insulated from one another. The frequencies and spacings are chosen such that no mutual disturbance occurs. Optionally, the sensor circuit 18 and the antenna circuit 19 may also be connected to one another and configured such that the capacitive sensor areas 13 are switched off while the antenna element 14 is active.

In the variant of the embodiment from FIG. 3, the antenna element 14 is positioned alongside the arrangement of the sensor areas 13. In the variant of the embodiment from FIG. 4, the antenna element 14 runs around the arrangement of sensor areas 13. In the case of FIG. 4, the electrical lines 20b for connecting the sensor areas 13 preferably run substantially perpendicularly to the electrically conducting structure of the antenna element 14, in order to minimize disturbing effects.

The sensor areas 13 and the antenna element 14 may be provided either on the same side of a carrier film or on different sides of a carrier film.

Figure 5:
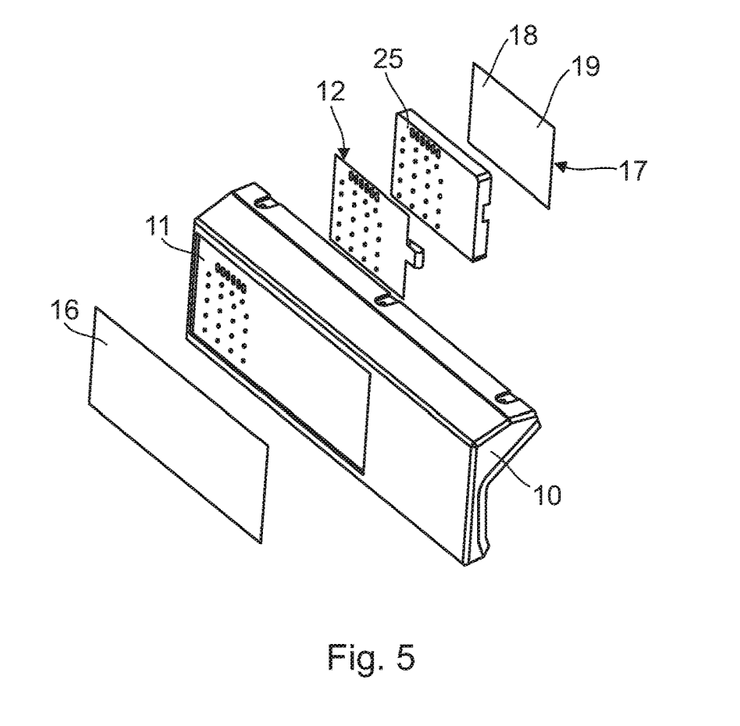
FIG. 5 is an exploded, perspective view of the input device according to a second exemplary embodiment of the invention.

With reference to FIG. 5, the structure of an input device according to a second exemplary embodiment of the invention is now described in more detail. In this case, the same or corresponding components are identified by the same reference numerals as in the first exemplary embodiment.

The input device from FIG. 5 differs from the first exemplary embodiment according to FIGS. 1 and 2 in particular in that the sensor film 12 is arranged on the side of the operator panel 10 that is facing away from a user.

Although it is not shown in the exemplary embodiment from FIG. 5, a decorative film 15 may also be optionally provided; in the embodiment from FIG. 5, for example, between the sensor film 12 and the operator panel 10 or between the top film 16 and the operator panel 10.

As illustrated in FIG. 5, a housing 25 for receiving the carrier plate 17 with the sensor circuit 18 and the antenna circuit 19 may also be provided. In this case, the housing 25 is fastened on the operator panel 10, for example by means of screwing or snapping into place. The sensor film 12 is fastened on the operator panel 10 by means of adhesive bonding.

Otherwise, the exemplary embodiment from FIG. 5 corresponds to the first exemplary embodiment from FIGS. 1 and 2 with its possible variants.

Figure 6:
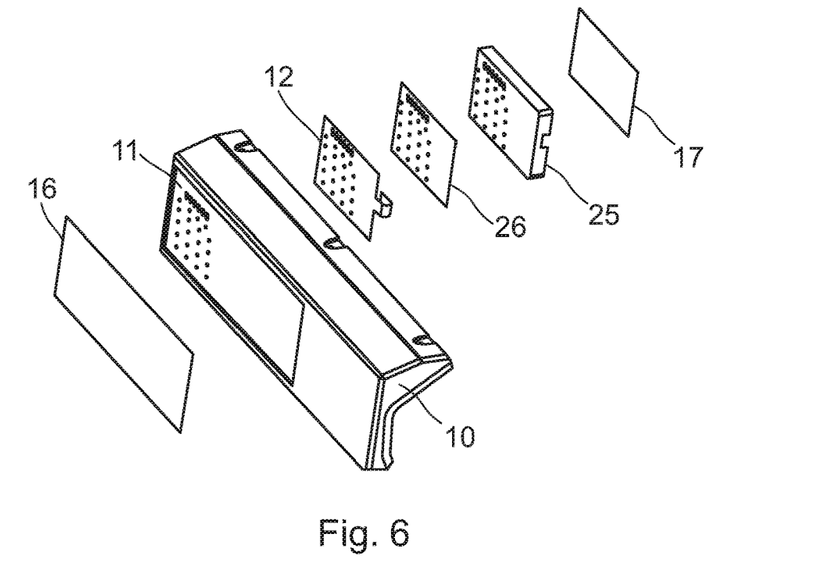
FIG. 6 is an exploded, perspective view of the input device according to a third exemplary embodiment of the invention.

With reference to FIG. 6, the structure of an input device according to a third exemplary embodiment of the invention is now described in more detail. In this case, the same or corresponding components are identified by the same reference numerals as in the previous exemplary embodiments.

The input device from FIG. 6 differs from the second exemplary embodiment according to FIG. 5 in that arranged between the housing 25 for the carrier plate 17 and the sensor film 12 there is a flexible pressure element 26, which is supported against the housing 25 and presses the sensor film 12 against the operator panel 10. The flexible pressure element 26 is for example a sheet of foam, for example of EPDM (ethylene-propylene-diene rubber). The pressure element has for example a layer thickness of approximately 2 mm. When such a pressure element 26 is used, it is possible to dispense with adhesive bonding of the sensor film 12 to the operator panel 10.

Otherwise, the exemplary embodiment from FIG. 6 corresponds to the second exemplary embodiment from FIG. 5 with its possible variants.

Figure 7:
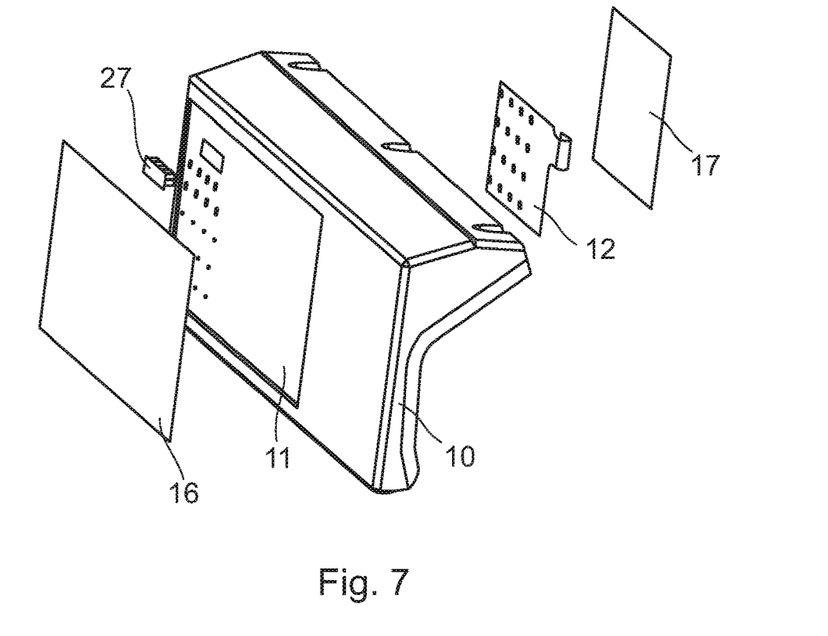
FIG. 7 is an exploded, perspective view of the input device according to a fourth exemplary embodiment of the invention.

With reference to FIG. 7, the structure of an input device according to a fourth exemplary embodiment of the invention is now described in more detail. In this case, the same or corresponding components are identified by the same reference numerals as in the previous exemplary embodiments.

In the exemplary embodiment from FIG. 7, at least one diffusion element 27 is additionally provided in the functional portion 11 of the operator panel 10, in order to diffuse the light directed through apertures in the operator panel.

This embodiment can be combined with all of the previous exemplary embodiments. That is to say that the carrier plate 17 may be fastened on the operator panel 10 or be accommodated in a housing 25 fastened on the operator panel 10, and the sensor film 12 may be fastened on the operator panel 10 by adhesive bonding or be pressed against the operator panel 10 by a flexible pressure element 26.

Figure 8:
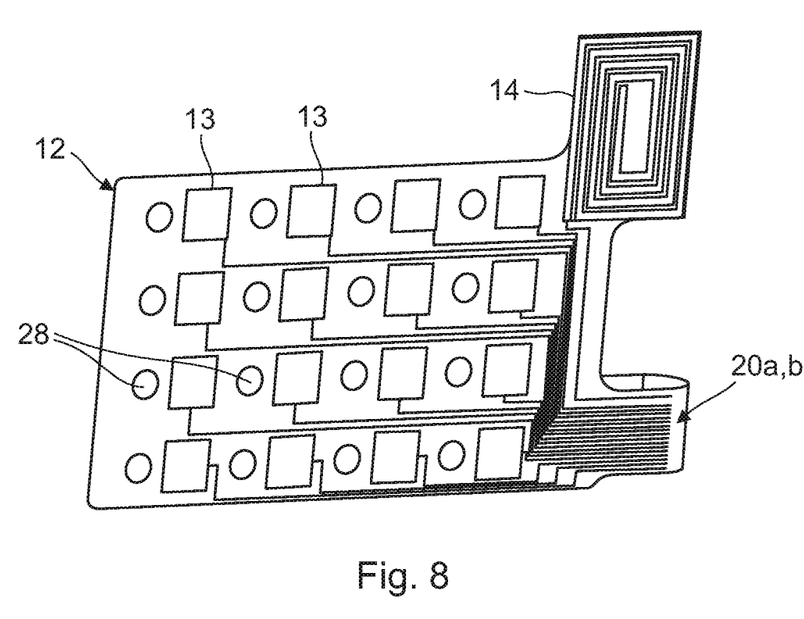
FIG. 8 is a perspective view of the sensor film for the input device according to the invention according to a further embodiment.
Figure 9:
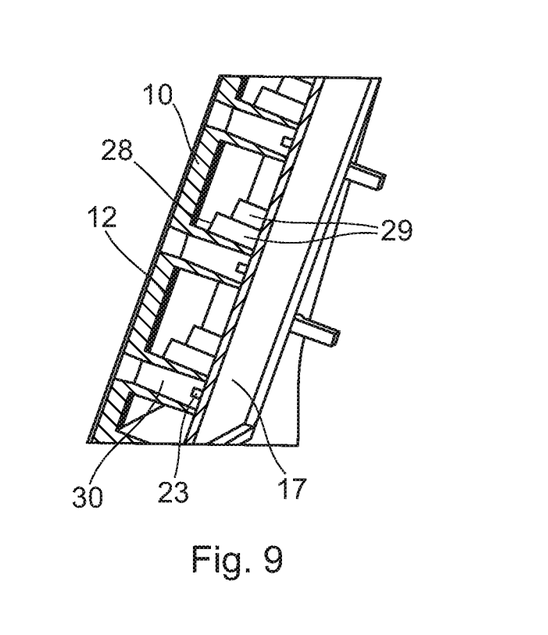
FIG. 9 is a partial sectional view of the input device according to the invention with the sensor film from FIG. 8.

With reference to FIGS. 8 and 9, a further embodiment of a sensor film and its integration in an input device of the invention are described in more detail. In this case, the same or corresponding components are identified by the same reference numerals as in the previous exemplary embodiments.

The sensor film 12 from FIG. 8 is provided with an arrangement of sixteen capacitive sensor areas 13, the electrode areas of which are connected by way of electrical lines 20a to the sensor circuit 18 on the carrier plate 17, and also an antenna element 14, the line structure of which is connected by way of further electrical lines 20b to the antenna circuit 19 on the carrier plate 17. In the embodiment from FIG. 8, the antenna element 14 is positioned alongside the arrangement of sensor areas 13. Alternatively, the antenna element 14 may also run around the arrangement of sensor areas 13.

The exemplary embodiment of the sensor film 12 from FIG. 8 differs from the embodiments according to FIGS. 3 and 4 by having multiple clearances 28. The clearances 28 are respectively positioned alongside the sensor areas 13 in the portion of the arrangement of sensor areas 13. As illustrated in FIG. 9, these clearances 28 may be connected to venting channels 29, in order to allow air between the sensor film 12 and the operator panel 10 to escape and therefore air inclusions to be prevented. The venting channels 29 may for example be a component part of the operator panel 10 or be mounted as separate elements on the carrier plate 17. Furthermore, the clearances 28 may serve for allowing light to pass through.

The sensor film 12 from FIG. 8 can likewise be used in all of the exemplary embodiments of the input device of the invention described above.

As shown in FIG. 9, the operator panel 10 may also have light channels 30, in order to direct light from lighting means 23 on the carrier plate 17 through the operator panel 10. The sensor film 12 is likewise provided with clearances at the locations of the light channels 30. At the end of the light channels 30, for example, a diffusion element 27 may then be mounted on the operator panel 10, as illustrated in FIG. 7. This variant of the embodiment is advantageous in particular when using operator panels of a non-light-transmissive material.

The invention claimed is:

1. A touch-sensitive and proximity-sensitive input device, comprising:
   an operator panel having a functional portion;
   a sensor film having at least one capacitive sensor area and at least one antenna;
   at least one electrical line;
   a carrier plate having a sensor circuit and disposed on a side of said operator panel that is facing away from a user, said at least one capacitive sensor area being connected to said sensor circuit by way of said at least one electrical line;
   at least one further electrical line; and
   an antenna circuit disposed on said carrier plate, said at least one antenna connected to said antenna circuit by way of said at least one further electrical line;
   wherein said sensor circuit and said antenna circuit are connected to one another and configured in such a way that said at least one capacitive sensor area is deactivated while said antenna is active.

2. The input device according to claim 1, wherein said antenna is disposed on said sensor film alongside said at least one capacitive sensor area or around said at least one capacitive sensor area.

3. The input device according to claim 1, wherein said sensor film is disposed on said side of said operator panel that is facing away from the user and said operator panel is configured as electrically non-conducting in a region of said functional portion.

4. The input device according to claim 3, further comprising a flexible pressure element disposed on said side of said operator panel that is facing away from the user, in order to press said sensor film against said operator panel.

5. The input device according to claim 1, further comprising an electrically non-conducting covering, wherein said sensor film is disposed on a side of said operator panel that is facing the user and is covered by said electrically non-conducting covering.

6. The input device according to claim 1, wherein said sensor film has at least one clearance formed therein in a region outside said at least one capacitive sensor area.

7. The input device according to claim 6, wherein said operator panel has at least one venting channel, which is connected to said at least one clearance in said sensor film.

8. The input device according to claim 1, wherein said operator panel has in said functional portion, on a side facing said sensor film, in a region outside said at least one capacitive sensor area, at least one depression formed therein for forming a free space between said sensor film and said operator panel.

9. The input device according to claim 1, wherein said operator panel is configured as raised on a side facing said sensor film, in a region of said at least one capacitive sensor area.

10. The input device according to claim 1, wherein said carrier plate is directly in engagement with said operator panel.

11. The input device according to claim 1, further comprising at least one light and/or at least one indicating device disposed on said carrier plate; and wherein said sensor film and said functional portion of said operator panel are configured as at least partially light-transmissive.

12. The input device according to claim 6, wherein said region is also outside an area of said antenna.

13. The input device according to claim 1, wherein said operator panel has in said functional portion, on a side facing said sensor film, in a region outside said at least one capacitive sensor area and also outside said antenna element, at least one depression formed therein for forming a free space between said sensor film and said operator panel.

14. The input device according to claim 1, wherein said operator panel is configured as raised on a side facing said sensor film, in a region of said at least one capacitive sensor area and also in a region of said antenna element.

15. The input device according to claim 1, further comprising a housing, said carrier plate is disposed in said housing that is in engagement with said operator panel.

16. A method of using a touch-sensitive and/or proximity-sensitive input device, which comprises the steps of:

providing the touch-sensitive and/or proximity-sensitive input device with:

an operator panel having a functional portion;
a sensor film having at least one capacitive sensor area and at least one antenna;
at least one electrical line;
a carrier plate having a sensor circuit and disposed on a side of the operator panel that is facing away from a user, the at least one capacitive sensor area being connected to the sensor circuit by way of the at least one electrical line;
at least one further electrical line; and
an antenna circuit disposed on the carrier plate, the at least one antenna element being connected to the antenna circuit by way of the at least one further electrical line;
wherein the sensor circuit and the antenna circuit are connected to one another and configured in such a way that the at least one capacitive sensor area is deactivated while the antenna is active; and installing the touch-sensitive and/or proximity-sensitive input device in an electronic domestic appliance or a commercial laundry treatment appliance.

17. The method according to claim 16, wherein the at least one antenna surrounds the at least one capacitive sensor area on the sensor film.

18. The input device according to claim 1, wherein said at least one antenna surrounds said at least one capacitive sensor area on said sensor film.

* * * * *